(12) United States Patent
Sallaka et al.

(10) Patent No.: US 8,397,273 B2
(45) Date of Patent: Mar. 12, 2013

(54) POLICY BASED PROVISIONING IN A COMPUTING ENVIRONMENT

(75) Inventors: Srikanth Sallaka, Fremont, CA (US); Roger Wigenstam, San Mateo, CA (US); Kamalendu Biswas, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 407 days.

(21) Appl. No.: 12/703,895

(22) Filed: Feb. 11, 2010

(65) Prior Publication Data

US 2011/0197254 A1    Aug. 11, 2011

(51) Int. Cl.
*H04L 29/06* (2006.01)
(52) U.S. Cl. .............................................. 726/1; 726/26
(58) Field of Classification Search ........................ 726/1
See application file for complete search history.

(56) References Cited

U.S. PATENT DOCUMENTS

| 7,587,755 B2* | 9/2009 | Kramer ............................ 726/4 |
| 7,757,271 B2* | 7/2010 | Amdur et al. ..................... 726/1 |
| 7,978,835 B2* | 7/2011 | Paden et al. ............. 379/201.01 |
| 2009/0132490 A1* | 5/2009 | Okraglik ........................... 707/3 |

OTHER PUBLICATIONS

Oracle Identity Manager, An Oracle White Papers—Oracle Fusion Middleware; Dec. 2008, 14 pages.

* cited by examiner

*Primary Examiner* — Kambiz Zand
*Assistant Examiner* — Ghodrat Jamshidi
(74) *Attorney, Agent, or Firm* — Trellis IP Law Group, PC (57) ABSTRACT

A system and method for policy based provisioning in a computing environment. In an example embodiment, the system is adapted to selectively allocate usage rights and access privileges to computing resources of a computing environment. The system includes a provisioning policy; a centralized resource provisioning module; one or more applications in communication with the centralized resource provisioning module; and software running on the resource provisioning module, wherein the software is adapted to initiate selective provisioning of computing resources offered by the one or more applications to a user in accordance with the provisioning policy.

23 Claims, 5 Drawing Sheets

POLICY BASED PROVISIONING IN A COMPUTING ENVIRONMENT

BACKGROUND

This application relates in general to computing-resource provisioning, and more specifically to systems and methods for allocating resource usage rights and access privileges to users of a computing environment.

For the purposes of the present discussion, a computing resource may be any computing entity, characteristic, or functionality. A computing entity may be any hardware and/or software functionality or components employed by one or more computers to facilitate performing a function. Examples of computing entities include software applications, hardware devices, networks, and so on. Examples of characteristics include communications link bandwidth, processor speed, data storage capabilities or allocations, and so on. Examples of functionality include email access and functions, Internet access, and so on. Note that computing resources may include hardware resources, such as memory, central processing unit time, and so on. Examples of software resources include email, Customer Relationship Management (CRM), and Human Capital Management (HCM) software for providing human resource management functionality, and so on.

Systems for allocating computing resource usage rights and access privileges are employed in various demanding environments and applications, including enterprise employee intake processing, government agent account set-ups, university student account setups, and so on. Such computing environments often demand efficient mechanisms for establishing new accounts (e.g., email accounts) for use with different software applications; for setting up user privileges and access to software applications, such as databases, calendar software, and so on.

Systems and methods for efficiently provisioning or allocating computing resource usage rights, access rights, and privileges are particularly important in enterprise environments. Such environments may include many applications and complex corporate provisioning policies, which may periodically change. For example, a corporate provisioning policy may require that a newly hired receptionist will have different privileges and access to a different set of computing resources than a newly hired corporate executive. The receptionist is said to have different roles than the corporate executive, where the roles affect provisioning policies that are applied to the user.

Each software application in an enterprise computing environment may include various application-specific settings that must be defined before a particular user can establish an account to access and/or use the application. Such applications, e.g., certain email applications or calendar applications, may require only a role, a username, and/or a password, while other applications may require an administrator to perform a sequence of manual set-up steps before a user can access functionality of the application.

An enterprise computing environment may include various users, such as employees, contractors, suppliers, customers, partners, etc., with different provisioning needs. The enterprise provisioning policy often must balance user-provisioning needs with the requirements of each software application to be used by a given user.

Conventionally, when an enterprise hires a new employee or acquires a new partner, customer, or supplier, a tedious manual process is employed to establish email accounts; set up access to particular databases; register for access to various applications and functionality available on the corporate network; obtain necessary approvals for registering certain accounts; validate or authenticate user account information; deliver account-setup confirmations, and so on. A similar process occurs when an employee, customer, partner, etc., changes roles or must otherwise update their resource privileges. The manual process may include registering a given user with each individual application using the application's interface, while simultaneously ensuring that the enterprise provisioning policy is being followed. Unfortunately, this is not only costly and time consuming, but may increase susceptibility to error and security breaches. This is particularly problematic in large enterprise systems that may need to periodically provision many applications and systems each time a new employee is hired, a customer is added to a CRM database, a provisioning policy is changed, a new software application is deployed, and so on.

Previous attempts to facilitate account registration and related provisioning processes involving multiple applications by standardizing the process have proven problematic, since different businesses often have substantially different requirements, application sets, and corresponding provisioning needs. One approach involved configuring applications to call the same Application Programming Interface (API) to create an account. Unfortunately, each application still relied upon different registration requirements, which complicated the process of accommodating changes in the computing environment. Generally, to account for changes in provisioning needs of an enterprise computing environment, re-coding, retesting, and redeploying of application components was required.

SUMMARY

An example method for selectively provisioning computing resources for a user includes: receiving a provisioning request pertaining to the user; determining a context associated with the provisioning request; referencing a provisioning policy to determine a set of predetermined policy rules to follow based on the context; and propagating provisioning instructions to one or more applications in the computing environment in accordance with the rules, where the provisioning instructions are adapted to initiate provisioning resources to a user in accordance with the policy rules.

In a more specific embodiment, the user includes a newly hired employee. The method further includes enabling an administrator to adjust the provisioning policy, thereby affecting what policy rules are followed in response to a given request, such as a provisioning request for the newly hired employee. The method further includes receiving the provisioning request from one or more software applications in the computing environment, where the provisioning request is received by a centralized software application included in the computing environment. The centralized software application is adapted to implement the method.

The novel design of certain embodiments disclosed herein is facilitated by use of policy-driven provisioning notifications sent to applications or other computing resources in response to a desired account change or other change in the allocation of computing resources. This obviates the need to re-code, retest, and redeploy components of applications or otherwise adjust computing resources when business flow or provisioning policies change.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For clarity, certain well-known components, such as hard drives, processors, operating systems, servers, power supplies, network adapters, and so on, have been omitted from certain figures. However, those skilled in the art with access to the present teachings will know which components to implement and how to implement them to meet the needs of a given application.

Figure 1:
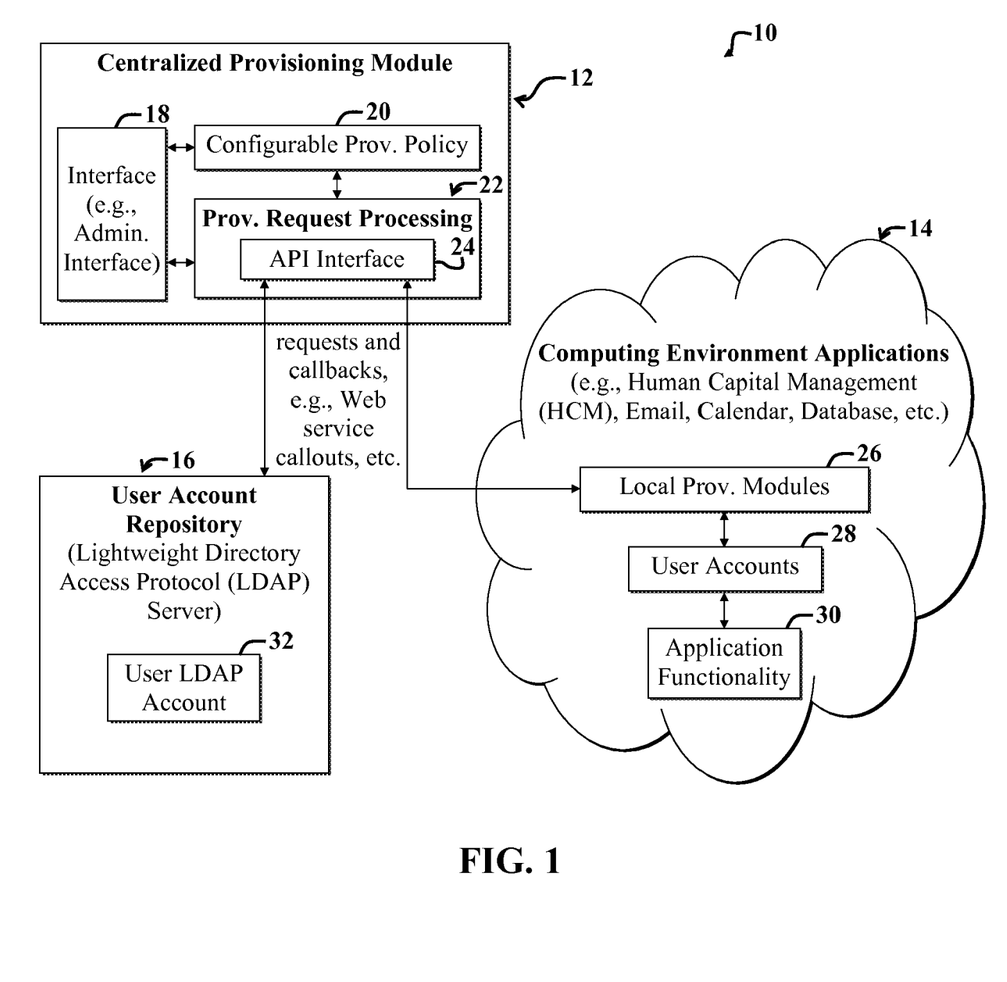
FIG. 1 is a diagram illustrating a first example embodiment of a system for provisioning computing resources to a user, such as a newly hired employee, based on a predetermined provisioning policy.

FIG. 1 is a diagram illustrating a first example embodiment of a system 10 for provisioning computing resources to a user, such as a newly hired employee, based on a predetermined provisioning policy. The system 10 is part of a computing environment.

For the purposes of the present discussion, a computing environment may be any collection of interconnected computing resources. An example of a computing environment includes an enterprise computing environment, which may include various computers, networks, and so on, used by a particular business. A provisioning policy may be any set of instructions and/or information indicating or affecting how resources should be or are to be provisioned in a computing environment. For example, a provisioning policy may include logic, instructions, and rules specifying that a given user to be allocated resources should be allocated access to certain applications based on one or more roles associated with the user; may specify how the user is to be notified of changes to associated resource allocations; may specify what permissions must be obtained to enable creation of certain types of accounts for a given user or group of users; may specify how certain newly added applications should be provisioned to certain users, and so on.

The example system 10 includes a centralized provisioning module 12 in communication with computing environment applications 14, and a user account repository 16, which may be considered a type of application or resource. For the purposes of the present discussion, an application may be any collection of hardware or software instructions adapted to implement predetermined functionality. Examples of applications include, but are not limited to, an Oracle Human Capital Management (HCM), email, calendar, and database applications.

For illustrative purposes the centralized provisioning module 12 is shown including an interface 18, which acts as an administrator interface, which may be used by an administrator of the provisioning module 12 to interact therewith, such as by configuring or changing a provisioning policy of the provisioning module 12 or submitting provisioning requests thereto. The provisioning module 12 further includes a configurable provisioning policy 20 that communicates with a provisioning request processing module 22. The provisioning request processing module 22 includes an Application Programming Interface (API) 24 and communicates with the interface 18, the user account repository 16, and the computing environment applications 14. For the purposes of the present discussion, a module may be any collection or grouping of functionality, which may include one or more applications.

The computing environment applications 14 may include various applications, such as HCM, email, calendar, and database applications, and so on, which all may have provisioning needs. For the purposes of the present discussion, an application is said to be provisioned for a user or to a user if an account for use of the application has been set up or if the user has otherwise established a way to access or use the application, such as by registering appropriate passwords, usernames, and so on. Note that different applications may have different requirements for registering a user, i.e., for enabling a particular user to have particular usage rights, access privileges, and so on, upon identification and/or validation of the user or validation of the information submitted by or on behalf of the user.

In the present example embodiment, the various applications 14 include respective local provisioning modules 26. The local provisioning modules 26 may include built-in functionality for facilitating registering, i.e., provisioning functionality associated with a given application to a user in accordance with predetermined policy rules. For illustrative purposes, information, such as user login or registration information for a particular one of the applications 14, is stored in one or more of the user accounts 28. Registration or provisioning of user accounts 28 provides a user with particular usage and access rights to the corresponding application functionality 30. For the purposes of the present discussion, application functionality may include any functions, operations, tasks, data, and so on, that may be accessible to or usable by a user of the associated application.

The API 24 is adapted to facilitate standardized communications between the centralized provisioning module 12 and the applications 14. Such communications may include Service Provisioning Markup Language (SPML) Web Service interfaces, Light Weight Directory Access Protocol (LDAP) interfaces, Simple Object Access Protocol (SOAP) interfaces, and so on. Exact details for the interfaces and types of messages sent between various modules of the system 10 are application specific and may be changed or altered to meet the needs of a given implementation. Note that in an alternative implementation, certain functionality associated with the API 24 may be included as communications interfaces or adapters in the applications 14.

The user account repository 16 may represent an application running on an LDAP server for hosting and listing information (such as login information) associated with the various user accounts 28 of the applications 14. The applications 14 may represent, for example, a suite of Oracle Fusion applications. To access the account for a particular user, the user logs into a user LDAP account 32 after the LDAP account 32 has been provisioned for a user. In certain implementations, the user LDAP account 32 may enable a user to locate organizations, individuals, and other resources, such as files and devices in a network.

The applications 14 and the user account repository 16 represent computing resources of the system 10, which corresponds to a computing environment. For the purposes of the present discussion, resources of a computing environment may be any functionality, entity, characteristic of the computing environment, and so on. For example, the resources of a computing environment, such as those that might be allocated or provisioned to a particular user, may include user accounts for particular applications (e.g., email, Internet access, and so on), the applications themselves, usage rights for software applications, access privileges to functionality or capabilities afforded by the computing environment, the functionality itself, and so on. A resource is said to be provisioned to or for a user if the user is registered with the application and has particular usage rights, access rights, and so on, to use or access the resource. In addition, a resource is said to be provisioned for (or to) a user if the user has otherwise been granted access to use a particular resource, such as an application.

The provisioning module 12 is said to be centralized. For the purposes of the present discussion, a computing entity, such as a provisioning system, is said to be centralized in a computing environment if various applications or resources in the computing environment communicate with the entity to affect how the applications or resources communicate with or otherwise affect each other. For example, a centralized provisioning system may be visualized as a choke point in communications flows through which communications pertaining to user provisioning operations flow and where the communications can be controlled and selectively manipulated to affect environment-wide resource provisioning. The centralized provisioning module 12 discussed herein may act as a provisioning controller to control provisioning requests by various computing entities, e.g., software applications 14, in the computing environment 10. Centralizing control over user resource provisioning in accordance with the present teachings may yield significant benefits, e.g., may facilitate propagating provisioning requests; may facilitate making changes to provisioning policies of the computing environment, and so on, as discussed more fully below.

In operation, the centralized provisioning module 12 facilitates centralized and configurable policy-driven provisioning of resources, including the applications 14, to users of the system 10, i.e., computing environment. Users of the system 10 may include human resources managers, newly hired employees, corporate partners, suppliers, contractors, customers, and so on.

Use of the centralized provisioning module 12 is particularly advantageous in demanding applications, such as employee intake processing, also called employee onboarding. In an example operative scenario, a hiring manager in a human resources department may employ a Human Capital Management (HCM) program, which may be included among the applications 14, to initiate a provisioning request for the newly hired employee. The provisioning request is sent to the provisioning request processing module 22, and the appropriate API 24 functionality for the HCM application is activated.

For the purposes of the present discussion, a provisioning request may be any message or set of messages with information or instructions pertaining to allocation of one or more computing resources. For example, a provisioning request might specify creation of a new email account for a new employee. The context of the request may be a description of the employee (e.g., manager, executive, etc.), where the context may be associated with one or more roles. In the request itself, user role information may correspond to the request context, and a given context may be associated with plural different roles.

A provisioning change request may be any provisioning request that specifies one or more changes to resource allocations to a user, where the user has already been allocated resources thereto by the accompanying system. A resource change request may be any provisioning change request applicable to a particular resource.

The provisioning request by the HCM application (to provision resources for a newly hired employee) is then processed by the provisioning request processing module 22 with reference to the configurable provisioning policy 20. For example, the provisioning policy 20 may include logic that analyzes the incoming provisioning request message for context information, role information, and so on, and then automatically initiates generation of user accounts or otherwise registers accounts 28 with the applications 14 for the new employee in accordance with the provisioning policy 20 and the information included in the provisioning request. For example, if the newly hired employee is a corporate executive, as specified in the provisioning request, the employee may be allocated certain accounts and resource access privileges by the provisioning module 12. If the newly hired employee is a receptionist, the provisioning policy 20 may necessitate that the provisioning module 12 allocate a different set of accounts and application usage rights and access privileges than those granted for the corporate executive.

To initiate generation of the user accounts 28 for a particular user, the provisioning request processing module 22 may employ the API 24 to deliver messages, such as callback messages, to the one or more applications 14. The messages are adapted to facilitate creation of one or more user accounts in the one or more applications 14.

The provisioning request sent by the HCM module may include information associating the newly hired employee with certain roles, where each role is associated with particular accounts to be provisioned to the employee. The provisioning policy 20 may specify that certain roles are to be allocated certain accounts, which are associated with particular resources and/or applications. The HCM module may include predetermined logic for forming the provisioning request for a particular employee, such as by assigning certain roles to the employee based on predetermined criteria. In addition, the provisioning request processing module 22 may be further adapted to facilitate account validation; to obtain or verify necessary approvals from certain users for the provisioning of a particular resource to the employee; to email or otherwise send a message to the newly hired employee to notify the employee which resources have been provisioned for the user, and so on, as discussed more fully below Note that employee intake represents a particular example operative scenario. Other scenarios include provisioning resources to new customers, partners, etc.; changing resources provisioned to a particular user, and so on. The provisioning module 12 is adapted to receive a provisioning request pertaining to any particular user and to provision one or more resources, such as one or more accounts, resource access rights, or resource usage rights based on the provisioning policy and contents of the associated provisioning request.

In the present example embodiment, the provisioning request processing module 22 includes one or more routines, i.e., computer-executable code, for implementing callback functionality to the various applications 14. For the purposes of the present discussion, callback functionality may be any resource operations or capabilities that use callbacks.

The communications link between the provisioning module 12 and external applications 14 may be called a callback link. For the purposes of the present discussion, a callback may refer to any message containing notification information or a query requesting notification information, where the message is sent between one or more of the applications 14 and the provisioning module 12. Notification information may be any instructions or information pertaining to the provisioning of one or more resources of the computing environment. For example, one type of callback specifies or indicates a status of a provisioned resource.

For example, a callback may be used to enable the provisioning module 12 to notify one or more applications 14 in the computing environment associated with the system 10 that certain resources associated with the one or more applications 14 are to be provisioned for a particular user. The provisioning request processing module 22 employs callbacks to selectively interact with one or more of the software applications 14 in the computing environment 10.

Certain predetermined provisioning policies, as specified via the policy 20, may specify that under certain conditions, the provisioning module 12 should call back an application to obtain additional information, such as status information pertaining to a particular provisioning request. For example, a certain policy may specify that for a particular provisioning request and request context that resource-provisioning status information pertaining to a current provisioning state of one or more computing resources be checked. For example, the provisioning module 12 may check an email application to verify that a given user has not already been assigned an email account via the application. The provisioning module 12 may adjust subsequent resource provisioning steps or may adjust previously provisioned resources based on status information retrieved via a callback message in accordance with the associated provisioning request and the provisioning policy 20.

As another example, certain applications may request that the provisioning module 12 use specific validation logic to validate information associated with a particular user, such as a customer. This information may be provided to the provisioning module 12 via a callback message.

By consolidating or centralizing the provisioning policy 20 for the system 10 in the centralized provisioning module 12, changes thereto are more readily made. For example, an administrator may employ the interface 18 to change or configure the provisioning policy 20 as needed to accommodate changes in enterprise provisioning policies without needing to modify adapters included in the applications 14. The provisioning policy 20 may include customizable business behavioral logic.

For example, if a new application is added to the applications 14, an administrator may employ the interface 18 to add a callback function to the provisioning request processing module 22 so that when a provisioning request is received, the new resources associated with new application may be provisioned to a user with reference to the provisioning policy 20 and the provisioning request. Use of the interface 18 to add or register new resources for use with the provisioning module 12 may obviates the need to re-code application adapters, and so on, to enable automatic provisioning of the new resource.

Various modules of the system 10 may be implemented via various mechanisms, such as web services, eXtensible Markup Language (XML) files, Universal Description, Discovery, and Integration (UDDI) registries, and so on. Exact implementation details are implementation specific and may be readily determined by those skilled in the art with access to the present teachings without undue experimentation.

Note that various communications links indicated by lines and arrows in FIG. 1 are for illustrative purposes. For example, various components and modules of the system 10 may intercommunicates in ways not shown or implied by the illustrative connecting lines.

Figure 2:
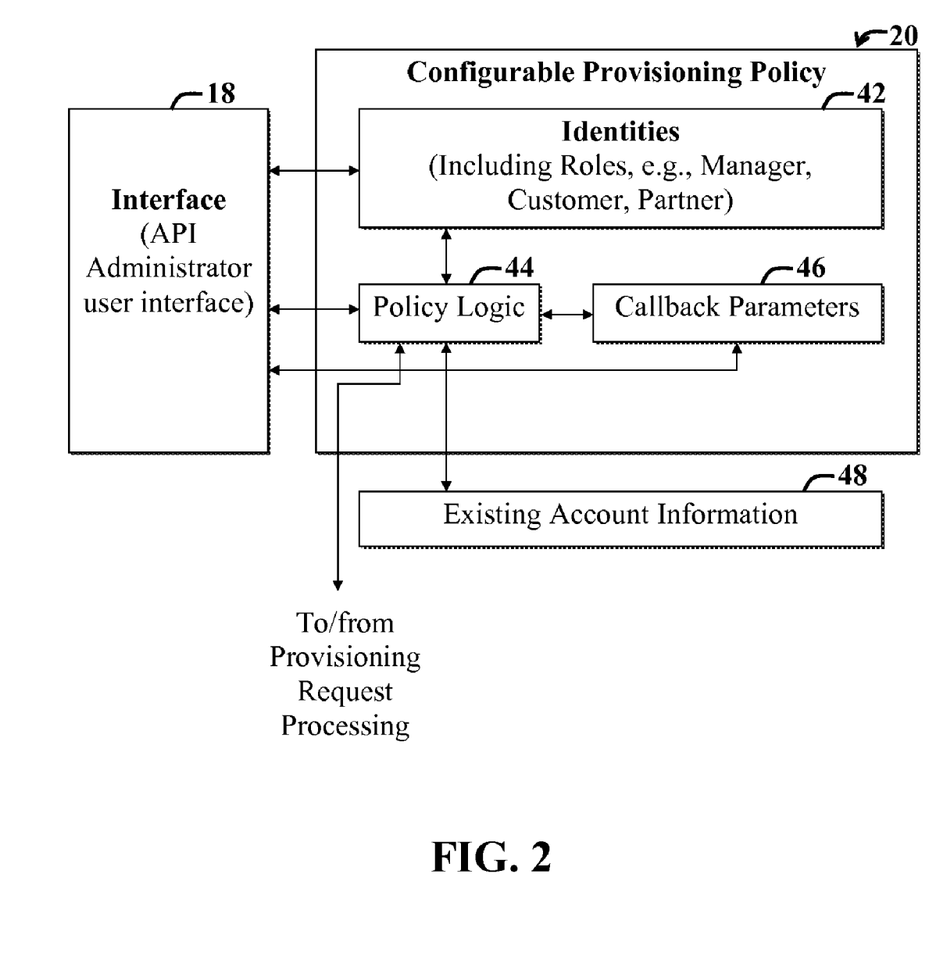
FIG. 2 is a more detailed diagram illustrating example components of the provisioning policy of the system of FIG. 1.

FIG. 2 is a more detailed diagram illustrating example components of the customizable provisioning policy 20 of the system 10 of FIG. 1. The example provisioning policy 20 includes policy logic 44 in communication with user identities 42, callback parameters 46, and existing resource-allocation information, i.e., account information 48. The various modules 42-46 of the provisioning policy 20 are editable or configurable, such as via an administrator, via the interface 18. Note that while the configurable provisioning policy 20 is shown including identities 42 and callback parameters 46 in addition to the policy logic 44, the identities 42 and callback parameters 46 may be stored outside the policy 20 and merely referenced by the policy logic 44 as needed, without departing from the scope of the present teachings. In general, the various groupings of modules shown herein (in FIGS. 1-5) may be adjusted or changed without departing from the scope of the present teachings. For example, the account information 48 may be included in the provisioning policy 20. Furthermore, note that the account information 48, identities 42, and callback parameters 46 may represent merely instances of copies of information that is stored elsewhere, e.g., in a repository, and that is merely retrieved into the provisioning policy module 20 for use thereby. Alternatively, the provisioning policy may refer only to the policy logic 44.

In operation, the policy logic 44 may reference identity information, such as roles associated with a particular user context, e.g., manager, executive, partner, customer, and so on, for a particular resource. The policy logic 44 may further reference callback parameters 46, which may identify various computing resources available for provisioning. The policy logic 44 may further refer to existing account information 48, which may specify accounts already provisioned for a particular user.

The policy logic 44 includes code that may selectively employ contents of the modules 42, 46, 48 to determine how resources should be provisioned in response to a particular provisioning request. A provisioning request may represent a request to provision a new user, such as a newly hired employee or a newly acquired partner, or may represent a change request to change resources provisioned to a preexisting user. Note that a user need not be limited to an individual person. For example, a user may refer to particular groups of persons, and so on.

In an example operative scenario, if a newly hired employee has been assigned the context of a manager, as determined with reference to the contents of a particular provisioning request, the policy logic 44 may refer to the identities module 42 to determine which roles are associated with the particular context. For example, a newly hired human resources manager may be allocated one or more roles that specify that the manager should have access to HCM software. The policy logic 44 may then determine what if any permissions must be obtained before a given resource can be allocated to the newly hired manager. Such permissions may be obtained, such as by initiating an automatic email message to an authorizing person or entity. If the newly hired manager is actually an existing manager that is being promoted to a different position, the policy logic 44 may employ the existing account information 48 to determine what if any changes need to be made to resources provisioned to the manager.

If a new resource is added, the policy logic 44 may determine what resource was added by reference to the callback parameters; then adjust provisioning messages sent to the applicable resources accordingly.

The above illustrative examples merely reference subset of the possible provisioning policies, policy logic behavior, information employed by the policy logic 44, and so on. Various modules 42-48 may be omitted, modified, incorporated into other modules, and so on, to meet the needs of a given implementation without departing from the scope of the present teachings.

Figure 3:
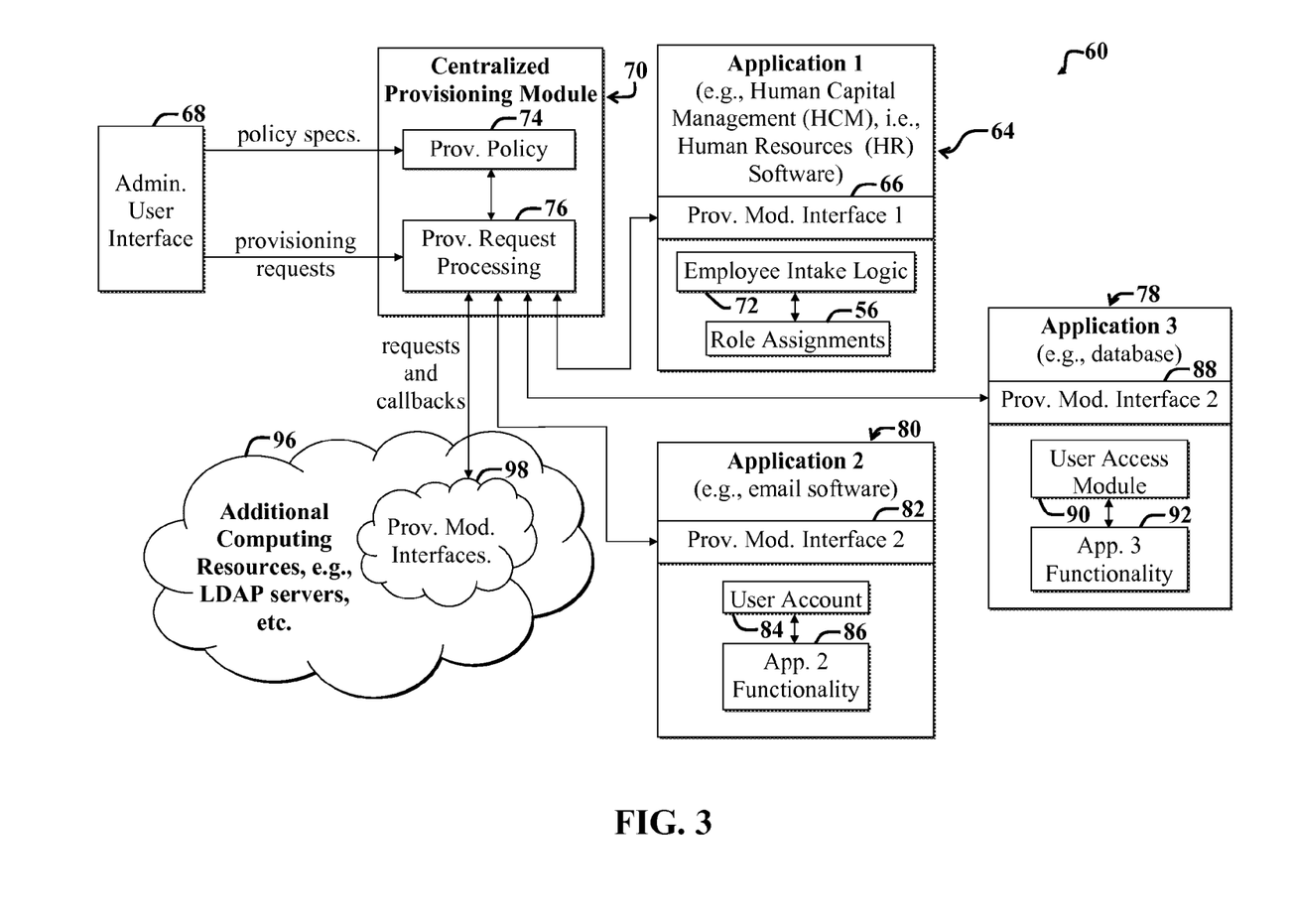
FIG. 3 is a diagram illustrating a second embodiment of a computing resource provisioning system for selectively allocating resource usage rights, access privileges, accounts, and so on for a user in accordance with a customizable and adaptable provisioning policy.

FIG. 3 is a diagram illustrating a second embodiment of a computing resource provisioning system 60 for selectively allocating resource usage rights, access privileges, accounts, and so on for a user in accordance with a customizable and adaptable provisioning policy 74.

The alternative centralized provisioning module 70 may operate similarly to the customize provisioning module 12 of FIG. 1. However, in the present embodiment, for illustrative purposes, the provisioning module 70 of FIG. 3 is shown not including the interface 18 of FIG. 1, which may enable an administrator to change the software associated with the centralized provisioning module 12. Instead, a basic administrator user interface 68 is employed to modify a provisioning policy 74 of the provisioning module 70 and to manually enter provisioning requests to a request processing module 76 of the provisioning module 70.

Furthermore, the alternative centralized provisioning module 70 is shown communicating with three example applications 64, 78, 80, and additional computing resources 96. In addition, in the present embodiment, an API is not specifically shown in the provisioning request processing module 76, as requisite interfacing functions for interfacing the applications 64, 78, 80 are included in the applications as local provisioning module interfaces 66, 88, 82, respectively. Furthermore, the additional computing resources 96 are interfaced with the provisioning module 70 via respective local provisioning module interfaces 98.

The first example application 64 may be an HCM software program, which includes employee intake logic 72 for assigning roles to particular employees. Employee context (e.g., manager) and role information (e.g., manager type) may be determined via the HCM application 64. Accordingly, when the first application 64 generates a provisioning request to the provisioning request processing module 76, the provisioning request includes context and role information to be used by the provisioning request processing module 76 with reference to the provisioning policy 74 to determine how resources should be allocated to the employee. For example, a newly hired employee may be provisioned an email account via the second application 80, and may be provisioned database access via the third application 78 in response to a request received by the provisioning module 70 from the first application 64.

The second example application 80 includes an email software application, which employs a user account 84 to enable user access to email functionality 86. The user account may be automatically provisioned by the provisioning module 70 in response to a request by another computing resource, such as the first application 64 or the second application 78. In certain implementations, the email application 80 may initiate provisioning requests and/or callback messages to the provisioning module 70 to facilitate provisioning resources to a user or to change provisioning information maintained by the centralized provisioning module 70.

The third application 78 includes database functionality 92 that is accessible via a user access module 90. The user access module 90 includes functionality to determine user permissions, such as access rights and usage rights based on user log-in information. User permissions may be automatically provisioned to a user via the centralized processing module 70 in response to a provisioning request received thereby from one or more of the applications 64, 78, 80 or from one or more of the additional resources 96.

For the purposes of the present discussion, a user permission associated with a file or resource may be any right of a user or particular software and/or hardware application to use the file or resource, such as by accessing, deleting, moving, or otherwise manipulating the file.

The ability of an application to employ the provisioning module 70 to automatically provision computing resources may be controlled by an administrator by making appropriated adjustments to the provisioning policy 74.

The first HCM application 64 is particularly adapted to facilitate employee onboarding, i.e., intake processing. Often, employee onboarding in an enterprise organization requires hiring manager to submit a provisioning request either directly to the provisioning module 70 or to an application (e.g., the HCM application 64) that propagates the request the provisioning module 70. The provisioning module 70 may also be called an identity management system.

For the purposes of the present discussion, an identity management system may be any collection of functionality for managing resources associated with a user or group of users based on the identity of the user or group of users. An example identity management system includes rules for identifying and authenticating a user (or group) and for obtaining authorization to allocate certain resources to the user in accordance with a provisioning policy and to notify the user as to the status of provisioning requests delivered to one or more resources or software applications in an accompanying computing environment.

Successful user provisioning results in the creation of appropriate accounts in various other business applications and other systems, such as the applications 64, 78, 80, and any systems included in the additional computing resources 96. Use of the provisioning module 70 may enable, for example, a newly hired employee to start using various business resources, e.g., business applications such as email, calendar and other systems, such as door entry locking systems, and so on. Similarly, when the business responsibility changes for a user then he/she may gain or lose access to other business resources. When the user leaves the organization then he/she looses all access rights to these business resources. Corresponding changes to the way resources are provisioned may be efficiently effect through use of the centralized provisioning module 70.

Such business responsibility changes may originate from applications, such as the HCM application 64, an access management system, and so on. The provisioning module accepts such changes, processes them using approval workflow as specified by the policy 74, and finally propagates user account information updates to other computing resources, such as the applications 64, 78, 80. Note that the provisioning module 70 can provision human identities such as employees, contractors, partners, and so on, as well as non human identities such as computers, network equipment, and so on. For the purposes of the present discussion, a user may be a human or a computing entity or group thereof that is adapted to use a particular computing resource.

One scenario addressed by the provisioning module 70 involves a situation wherein business responsibility changes require interactions with the application that submitted the request or other designated applications, during the processing of the submitted request. For example, if human resource application submits an employee on boarding request then the provisioning module 70 may require a background check with another external system. It may also require assigning few default responsibilities that will enable the employee to use office productivity applications such as email, calendar, and so on, without any additional access request submission.

With use of the system 60, if business requirement of an organization requires that newly hired employee should have accounts automatically provisioned for email, calendar, building door entry system, 401k, tax management account, and so on, then all such applications should be in communication with the centralized provisioning module 70. The provisioning module 70 facilitates implementing a method whereby provisioning notification propagation is implemented via the provisioning module 70. The provisioning module 70 includes computer code to facilitate processing and managing change requests based on policies 74 using standard interfaces (such as interface defined for pre-processing, validation etc). This obviates the need to hard-coded fixed business logic in each application. It also allows one requestor application to generate change events and then use provisioning module 70 to notify other applications/systems and to propagate changes to the other applications/systems.

For example, human resource system, such as the HCM application 64, may request creation of an employee account. When account creation is complete the provisioning module 70 can propagate account-creation instructions such to other applications such as email, computer login account, 401k account, healthcare account etc. to setup accounts automatically for that user.

Without an embodiment in accordance with the present teachings, existing computing environments required additional administrative steps to provision such accounts in other systems, modifications to business logic in each application were required. Using the present embodiment 60, after initial setup of the system 60 and accompanying provisioning module 70, when a new application needs provisioning information, a system administrator can simply change the policy configuration (represented by the provisioning policy 74 and the provisioning request processing module 76) so that provisioning notifications are propagated to the new application.

When an application, such as human resource system, submits user account creation request, the provisioning module 70 accepts the request and initiates the provisioning process. During provisioning request processing, a particular request may go through various steps, depending on applicable business flows based on the business policy 74 of the corresponding organization.

Example provisioning request processing includes:

Pre processing: This step allows the data integrity of a submitted request data to be checked. Any default data may be computed be computed and added to the request. For example, default roles for the new employee account that will allow employee to access business applications like email and provision a phone number for the employee may be included.

Validation: This stage validates entire request data value along with default data added in the pre-processing stage. For example, if a user's social security number is missing for the employee account, then a tax account management application privilege may be omitted from the provisioning request.

Approval: This stage allows a provisioning request to be examined by human interactions for request approval. For example, an employee termination request may be approved by an appropriate manager. Approval can be automatic in certain scenarios. Automatic approval does not require any human intervention. For example, an employee promoted to a manager might be able see his/her subordinates benefit information, depending upon the implementation. An approver may be allowed to modify or correct a subset of the requested data.

Post processing: This stage allows processed account information to be provided to the requestor or any other relevant entities. At this stage, account processing is complete from the provisioning module 70 perspective, and designated applications will get updates for the corresponding account. For example, email, calendar applications may receive notifications for the updated account information.

Completion: At this stage, provisioning module receives a post-processing reply for all concerned entities, indicating that the entities, i.e., resources, have completed their own relevant internal processing, if any. The provisioning module 70 then sends back a completing event message to the appropriate applications indicating that request processing has successfully completed. For example, in response to post-processing notifications, email and calendar application may send back a notification to the provisioning module 70 indicating that post-processing replies were received successfully and that any locally stored user information has been updated successfully.

The provisioning module 70 includes code for enabling calling back the requestor application or any other entities to provide additional data or process part of the submitted data or even validate it. In each processing stage, if the provisioning module 70 needs to contact more than one entity/resource, then such operations could be invoked sequentially or in parallel. When permitted, parallel operation may reduce request processing time and may improve overall efficiency of the system 60. If a change occurs in the provisioning module 70 for a particular identity/user, then the provisioning module 70 can notify such changes to the application in accordance with the above methodology.

Above mentioned stages may employ communication over network between the provisioning module 70 and the resources, e.g., applications, 64, 78, 80, 96. Accordingly, appropriate security mechanisms are used to secure the overall security of the system 60.

Hence, the present embodiment allows policy driven notifications to applications in multiple stages when account change happens in the computing environment, i.e., system 60. This avoids the need to make application changes when business flow or provisioning policy changes. Such flow changes can be implemented via changes to the policy 74 of the policy-driven provisioning module 70. This obviates the need for applications themselves to propagate provisioning changes to other applications, thereby avoiding any tedious application changes when business flow changes in an organization.

Figure 4:
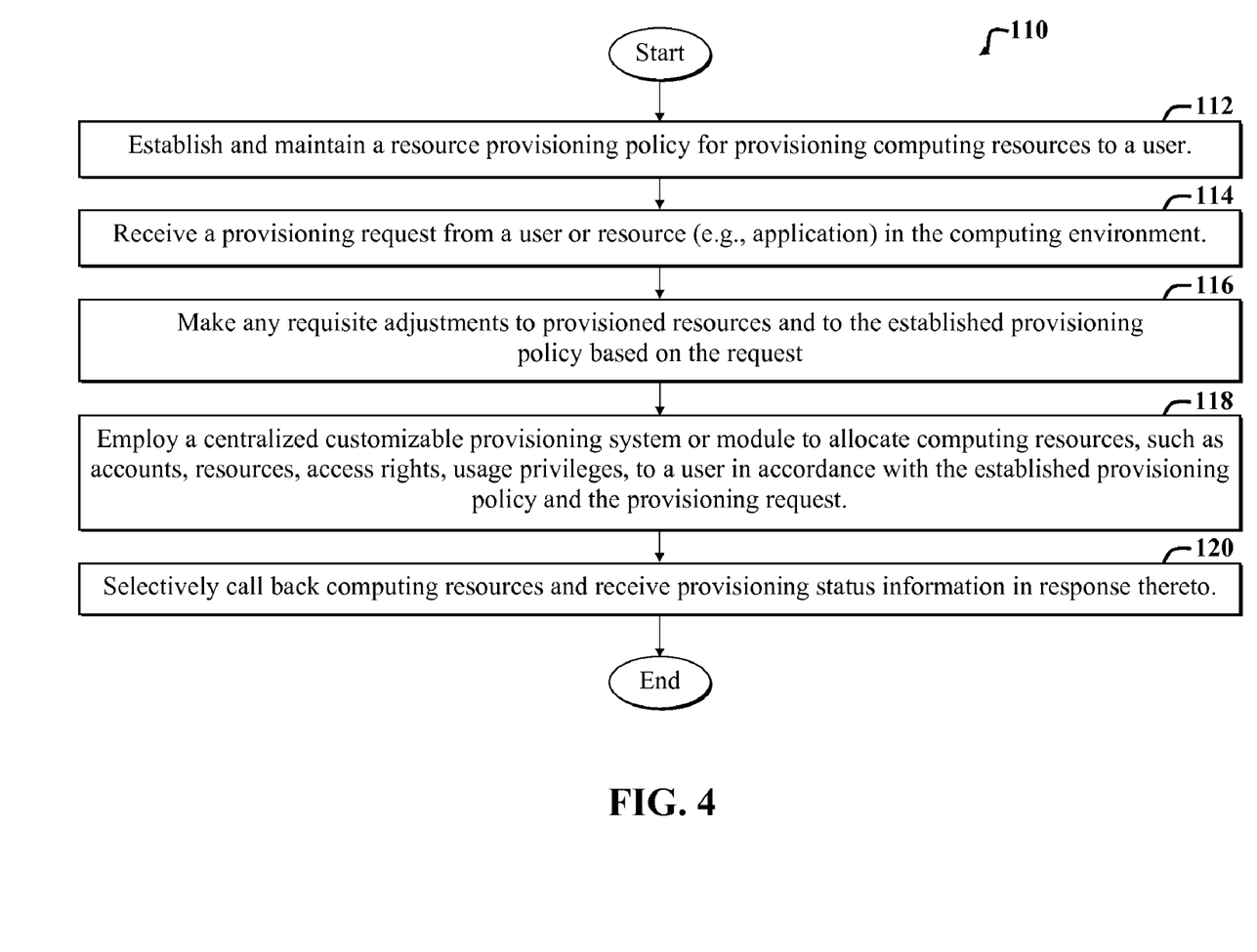
FIG. 4 is a flow diagram of a first method adapted for use with the provisioning systems of FIGS. 1 and 3.

FIG. 4 is a flow diagram of a first method 110 adapted for use with the provisioning systems 10, 60 of FIGS. 1 and 3. The method 110 includes a first step 112, which includes establishing and maintaining a resource provisioning policy for provisioning computing resources to a user.

A second step 114 includes receiving a provisioning request from a user or resource (e.g., application) in the computing environment.

A fifth step 116 includes making any requisite adjustments to provisioned resources and to the established provisioning policy based on the request.

A third step 116 includes employing a centralized customizable provisioning system or module to allocate computing resources, such as accounts, resources, access rights, usage privileges, to a user in accordance with the established provisioning policy and the provisioning request.

A fourth step 118 includes selectively calling back computing resources and receiving provisioning status information in response thereto, where the status information may be used to further adjust provisioned resources as needed to meet policy specifications.

Note that various steps of the method 110 may be altered, changed, interchanged with other steps, or omitted, or additional steps may be added without departing from the scope of the present teachings. For example, the fourth step 118 and the fifth step 120 may be omitted or replaced with other steps.

Figure 5:
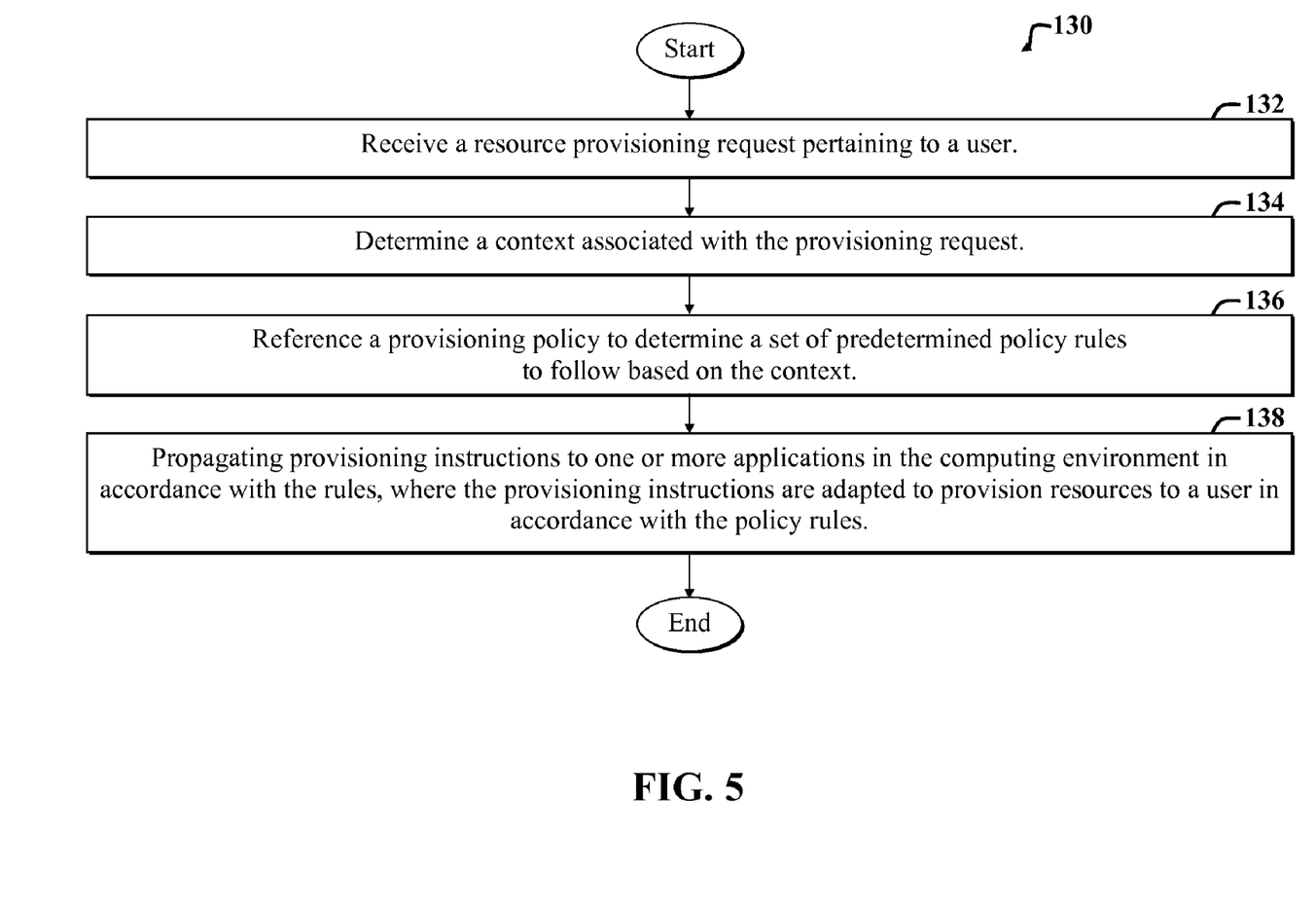
FIG. 5 is a flow diagram of a second method adapted for use with the provisioning systems of FIGS. 1 and 3.

FIG. 5 is a flow diagram of a second method 130 adapted for use with the provisioning systems of FIGS. 1 and 3. The method 130 includes an initial receiving step, which includes receiving a resource provisioning request pertaining to a user.

A subsequent determining step 134 includes determining a context associated with the provisioning request.

Next, a referencing step 136 includes referencing a provisioning policy to determine a set of predetermined policy rules to follow based on the context.

Subsequently, a propagating step 138 includes propagating provisioning instructions to one or more applications in the computing environment in accordance with the rules, where the provisioning instructions are adapted to provision resources to a user in accordance with the policy rules.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for selectively provisioning resources of a computing environment to a user of the computing environment, the method comprising the following acts performed by one or more digital processors:
   receiving a provisioning request pertaining to a particular user of the computing environment from a human capital management (HCM) application, with the provisioning request including a role assigned to the particular user by the HCM application;
   referencing, using the digital processor, a provisioning policy to determine a first resource of the computing environment to automatically make accessible to the particular user based on the role assigned to the particular user and a second resource available to the particular user based on the role assigned to the particular user and only if necessary approvals are obtained;
   attempting, using the digital processor, to obtain necessary approvals required to make the second resource available to the particular user;
   configuring, using the digital processor, the first resource to be available to the particular user; and
   configuring, using the digital processor, the second resource to be available to the particular user only if necessary approvals are obtained.

2. The method of claim 1, wherein the particular user is a newly hired employee.

3. The method of claim 1, further including:
   enabling an administrator to adjust the provisioning policy and thereby affect what policy rules are followed in response to a given request.

4. The method of claim 1, further including:
   receiving the provisioning request from one or more software applications in the computing environment.

5. The method of claim 1, wherein the provisioning request is received by a centralized software application included in the computing environment.

6. The method of claim 5, wherein the centralized software application is adapted to implement the method.

7. The method of claim 6, wherein the centralized software application includes an Application Programming Interface (API).

8. A system for selectively allocating usage rights and access privileges to computing resources of a computing environment, the system comprising:
   at least one digital processor;
   one or more tangible, non-transitory processor-readable storage devices; and
   instructions included in the one or more tangible, non-transitory processor-readable storage devices, wherein the instructions are executable by the at least one digital processor, wherein the instructions are adapted to perform the steps of receiving a provisioning request pertaining to a particular user of the computing environment from a human capital management (HCM) application, with the provisioning request including a role assigned to the particular user by the HCM application, referencing a provisioning policy to determine a first resource of the computing environment to automatically make accessible to the particular user based on the role assigned to the particular user and a second resource available to the particular user based on the role assigned to the particular user and only if necessary approvals are obtained, attempting to obtain necessary approvals required to make the second resource available to the particular user, configuring the first resource to be available to the particular user and configuring the second resource to be available to the particular user only if necessary approvals are obtained.

9. The system of claim 8, wherein the provisioning policy includes rules governing how a newly hired employee of an enterprise is to be allocated usage rights and access privileges to the one or more applications.

10. The system of claim 8, wherein the computing resources include an email account.

11. The system of claim 8, wherein the computing resources include access to a database.

12. The system of claim 1, wherein the provisioning policy is configurable.

13. An apparatus for detecting changes in a computing environment, the apparatus comprising:
a digital processor;
one or more tangible, non-transitory processor-readable storage devices coupled to the digital processor, wherein the one or more storage devices further include instructions executable by the digital processor for:
receiving a provisioning request pertaining to a particular user of the computing environment from a human capital management (HCM) application, with the provisioning request including a role assigned to the particular user by the HCM application;
referencing, using the digital processor, a provisioning policy to determine a first resource of the computing environment to automatically make accessible to the particular user based on the role assigned to the particular user and a second resource available to the particular user based on the role assigned to the particular user and only if necessary approvals are obtained;
attempting, using the digital processor, to obtain necessary approvals required to make the second resource available to the particular user;
configuring, using the digital processor, the first resource to be available to the particular user; and
configuring, using the digital processor, the second resource to be available to the particular user only if necessary approvals are obtained.

14. A provisioning system for provisioning computing resources to a user of a computing environment, the system comprising:
a first module adapted to maintain a configurable provisioning policy;
a second module adapted to receive a provisioning request for a particular user of the computing environment from a human capital management (HCM) application with provisioning request including a role assigned to the particular user by the HCM application; and
a third module adapted to, reference the provisioning policy to determine a first resource of the computing environment to automatically make accessible to the particular user based on the role assigned to the particular user and a second resource available to the particular user based on the role assigned to the particular user and only if necessary approvals are obtained, attempt to obtain necessary approvals required to make the second resource available to the particular user, configure the first resource to be available to the particular user and configure the second resource to be available to the particular user only if necessary approvals are obtained.

15. The system of claim 14, wherein the provisioning policy includes a set of rules applicable to provisioning computing resources to a user, wherein the rules are based in part upon a context or role associated with the user and predetermined enterprise provisioning policies.

16. The system of claim 14, wherein the system includes employee-intake software application for initiating a resource provisioning request for a newly hired employee, and forwarding the resource provisioning request to the second module.

17. The system of claim 16, wherein the second module includes instructions for selectively automatically provisioning computing resources to the newly hired employee based on the predetermined provisioning policy.

18. The system of claim 17, wherein the computing resources include an email account.

19. The system of claim 17, wherein the provisioning resources include access to a database.

20. The system of claim 14, wherein the system is adapted for use with a computing environment that includes plural software applications, the plural software applications including functionality to be selectively provisioned for the user by the system.

21. The system of claim 14, wherein the provisioning policy includes one or more application callbacks.

22. The system of claim 21, wherein the first module is in communication with a user interface, where the user interface is adapted to enable an administrator to add, remove, or change callbacks in the provisioning policy.

23. The system of claim 22, wherein the one or more callbacks include functionality to enable the system to notify one or more applications in a computing environment associated with the system that certain resources associated with the one or more applications are to be provisioned for a particular user.

* * * * *

UNITED STATES PATENT AND TRADEMARK OFFICE
CERTIFICATE OF CORRECTION

PATENT NO. : 8,397,273 B2
APPLICATION NO. : 12/703895
DATED : March 12, 2013
INVENTOR(S) : Sallaka et al.

It is certified that error appears in the above-identified patent and that said Letters Patent is hereby corrected as shown below:

In the Specification:

In column 6, line 51, after "below" insert -- . --.

In column 10, line 45, delete "looses" and insert -- loses --, therefor.

Signed and Sealed this
Fourth Day of June, 2013

Teresa Stanek Rea
*Acting Director of the United States Patent and Trademark Office*